United States Patent
Calvert

(10) Patent No.: US 7,080,250 B2
(45) Date of Patent: Jul. 18, 2006

(54) SYSTEM, METHOD AND PROGRAM PRODUCT FOR AUTOMATICALLY COLLECTING STATE INFORMATION FOR COMPUTER SYSTEM INTRUSION ANALYSIS

(75) Inventor: Christopher L. Calvert, Erie, CO (US)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 10/112,829

(22) Filed: Mar. 29, 2002

(65) Prior Publication Data

US 2003/0191962 A1 Oct. 9, 2003

(51) Int. Cl.
*G06F 11/30* (2006.01)
(52) U.S. Cl. .................. 713/168; 713/200; 713/201
(58) Field of Classification Search ............... 713/168, 713/200, 201
See application file for complete search history.

(56) References Cited

U.S. PATENT DOCUMENTS

| | | | |
|---|---|---|---|
| 5,386,552 A | | 1/1995 | Garney |
| 5,410,685 A | | 4/1995 | Banda et al. |
| 5,603,323 A | * | 2/1997 | Pflugrath et al. ........... 600/437 |
| 5,745,268 A | * | 4/1998 | Eastvold et al. ............ 398/25 |
| 6,022,315 A | * | 2/2000 | Iliff ............................ 600/300 |
| 6,275,942 B1 | | 8/2001 | Bernhard et al. |
| 6,279,010 B1 | | 8/2001 | Anderson |
| 6,345,283 B1 | | 2/2002 | Anderson |
| 6,598,011 B1 | * | 7/2003 | Howards et al. ............ 702/185 |

OTHER PUBLICATIONS

Holley, J., "Getting the Hard Facts, " Secure Computing Magazine, Apr. 2001, pp. 56-58, 60, 62, 64.
Lippmann, R. et al., "1999 DARPA off-line intrusion detection evaluation, " Computer Networks, vol. 34 No. 4, Oct. 2000, pp. 1-2 (abstract only).
Mell, P., "Understanding Intrusion Detection Systems, " EDP Audit, Control, and Security Newsletter, vol. 29 No. 5, Nov. 2001, pp. 1-10.
Patzakis, J. M., "Computer Forensics —From Cottage Industry to Standard Practice, " Information Systems Control Journal, vol. 2, 2001, pp. 25-27.

* cited by examiner

*Primary Examiner*—Thomas R. Peeso
(74) *Attorney, Agent, or Firm*—John R. Pivnichny; Hoffman, Warnick & D'Alessandro LLC

(57) ABSTRACT

A system, method and program product for automatically collecting state information for computer system intrusion analysis is provided. Specifically, the present invention is used to automatically collect state information in the event of computer network intrusion. When executed, the present invention will detect a type of a platform operating on a computer system (e.g., the server). Then, using the utilities of the platform, the desired state information will be located and/or collected. Thus, the present invention provides the uniformity of information collection that was not previously possible due to manual collection techniques and varying platform types.

23 Claims, 3 Drawing Sheets

SYSTEM, METHOD AND PROGRAM PRODUCT FOR AUTOMATICALLY COLLECTING STATE INFORMATION FOR COMPUTER SYSTEM INTRUSION ANALYSIS

BACKGROUND OF THE INVENTION

1. Field of the Invention

The present invention generally relates to a system, method and program product for automatically collecting state information for computer system intrusion analysis. Specifically, the present invention allows state information to be automatically collected from a computer system regardless of the platform operating thereon.

2. Background Art

Computer system intrusion (e.g., hacking) has become a serious problem for governments and businesses. Specifically, a hacker can gain unauthorized access to a network by establishing a connection to a server (i.e., host). Once connected, the hacker can severely disrupt or crash the network. Each year, billions of dollars are lost to such hacker intrusions.

When hacker intrusion occurs, it is essential to be able to discern how the intrusion occurred and to what degree the network was affected. To this extent, state information regarding the server and its network environment is essential. State information relates to the condition of being of a system, and is subject to change (e.g., is dynamic). In general, the state of a system (e.g., a server) is maintained in various file locations as well as in volatile memory such as Random Access Memory (RAM). State information typically includes information such as network interface configuration, active environment variables, routing tables, active network services, etc. In the event of intrusion, state information is usually affected in a manner that can indicate the details of the intrusion. Accordingly, state information can be extremely valuable for intrusion analysis.

Heretofore, the collection of state information has been a time-consuming and inaccurate process as no tools currently exist to automatically collect the information. In contrast, existing tools typically focus on recovering non-state information such as files (e.g., memorandums, electronic mail messages, etc.) from a computer system's hard drive and/or file slack space. While such information may help show wrongdoing by an authorized user of the network, it provides little use in the event of intrusion. If state information is desired, it must be manually recovered by an intrusion investigator or a system administrator. Unfortunately, the manual recovery of state information yields mixed results. For example, different administrators might recover different types of information. Moreover, as platforms (operating systems) change, the manner in which state information is stored and retrieved may change as well. For example, the manner in which state information is recovered a computer system operating with UNIX version "A" might differ from the manner in which it is recovered from a computer system operating with UNIX version "B." This makes collection of the necessary state information extremely difficult.

In view of the foregoing, there exists a need for a tool for automatically collecting state information for computer system intrusion analysis. In addition, a need exists for such a tool to be able to identify the type of a platform operating on a computer system so that the information can be more readily recovered. A further need exists for a tool that uses the utilities of the identified platform to locate the sought information.

SUMMARY OF THE INVENTION

The present invention relates to a system, method and program product for automatically collecting state information for computer system intrusion analysis. Specifically, under the present invention, a tool is loaded onto a hacked (intruded) computer system. The tool will first identify the platform operating on the system. Once identified, the tool will utilize the utilities of the platform to recover, protect and output the state information. The state information collected under the present invention typically includes: (1) computer information pertaining to the intruded computer system itself; (2) network information pertaining to the network in which the computer system is operating; (3) information pertaining to network services and the files associated with those services; (4) process information pertaining to processes currently running on the computer system; (5) trust information pertaining to trusts extended by the computer system over the network; and (6) log files information.

According to a first aspect of the present invention, a system for automatically collecting state information for computer system intrusion analysis, is provided. The system comprises: (1) a platform identification system for automatically identifying a type of a platform loaded on a computer system; and (2) a state system for automatically collecting state information pertaining to a state of the computer system, wherein the state information is located with utilities of the identified platform.

According to a second aspect of the present invention, a method for automatically collecting state information for computer system intrusion analysis is provided. The method comprises the steps of: (1) identifying a type of a platform loaded on a computer system; (2) locating state information pertaining to a state of the computer system using utilities of the identified platform; and (3) automatically collecting the located state information from the computer system.

According to a third aspect of the present invention, a program product stored on a recordable medium for automatically collecting state information for computer system intrusion analysis is provided. When executed, the program product comprises: (1) program code for automatically identifying a type of a platform loaded on a computer system; and (2) program code for automatically collecting state information pertaining to a state of the computer system, wherein the state information is located with utilities of the identified platform.

Therefore, the present invention provides a system, method and program product for automatically collecting state information for computer system intrusion analysis.

BRIEF DESCRIPTION OF THE DRAWINGS

These and other features of this invention will be more readily understood from the following detailed description of the various aspects of the invention taken in conjunction with the accompanying drawings in which.

Figure 1:
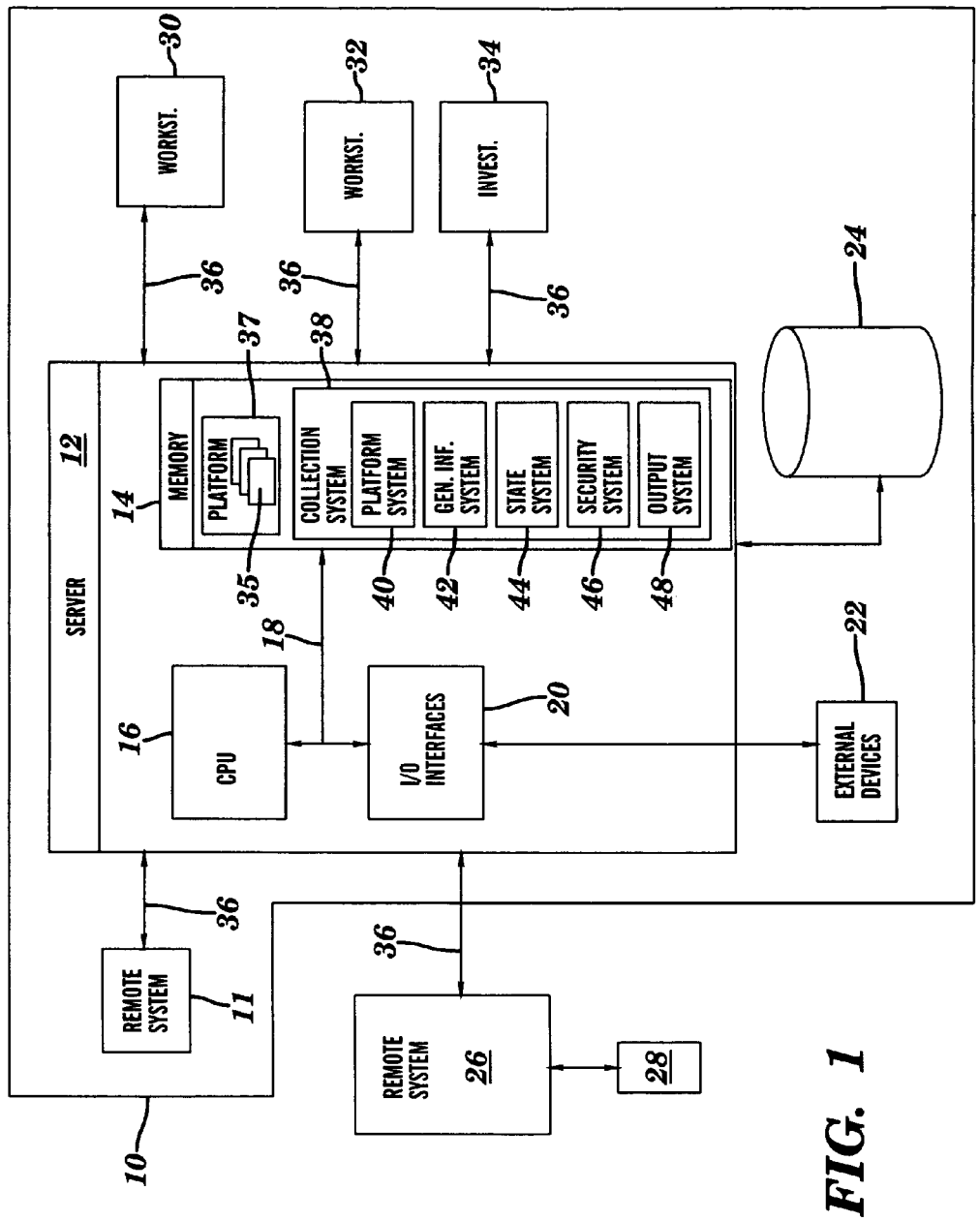
FIG. 1 depicts a computer system having a collection system according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides automatic collection of state information for computer system intrusion analysis. As indicated above, the collection of state information to date has been performed manually. That is, an investigator or system administrator must manually locate and collect the state information. This is often an inconsistent process as different individuals might collect different types of information. Moreover, as platforms vary, the manner in which the information is stored might vary as well. The present invention therefore, provides a system, method and program product for automatically collecting state information regardless of the platform operating on the system under investigation. As used herein, the term "state" is intended to refer to the condition of being of a system such as a network server. The state of a system can be determined by retrieving various pieces of state information from volatile memory and/or configuration log files. Such information provides valuable insight when conducting intrusion analysis.

Referring now to FIG. 1, a typical implementation of the present invention is shown in detail. In general, the present invention is used to collect state information when a network 10 is intruded. As shown in FIG. 1, network 10 is hosted by server 12 and includes workstations 30 and 32 and remote system 11. Hacker 28 can intrude into network 10 by establishing an (unauthorized) connection with server 12 through remote system 26. Upon intrusion, investigator 34 will perform intrusion analysis by collecting state information collected from server 12. As further shown, remote systems 11 and 26, workstations 30 and 32, 20 and investigator 34 communicate with server 12 via communications links 36. Communications links 36 are intended to represent any possible method of communicating with server 12. For example workstations 30 and 32 can communicate directly as a terminal connected to server 12, or remotely in a client-server environment. In the case of the latter, the client and server may be connected via the Internet, wide area networks (WAN), local area networks (LAN) or other private networks. The client and server may utilize conventional network connectivity, such as Token Ring, Ethernet, or other conventional communications standards. Remote systems 11 and 26 are intended to be representative of systems connected to server 12 in a client-server environment via, for example, the Internet. In this case, connectivity could be provided by conventional TCP/IP sockets-based protocol, and remote systems 11 and 26 would utilize an Internet service provider to establish connectivity to server 12. Investigator 34 can communicate with server 12 in any known manner (e.g., directly, via workstation 30, via remote system 11, etc.). It should be understood that the depiction of FIG. 1 is intended to be exemplary only, and that the present invention could be implemented with any network variation.

As shown, server 12 generally comprises memory 14, central processing unit (CPU) 16, bus 18, input/output (I/O) interfaces 20, external devices/resources 22 and database 24. Memory 14 may comprise any known type of data storage and/or transmission media, including magnetic media, optical media, random access memory (RAM), read-only memory (ROM), a data cache, a data object, etc. Moreover, memory 14 may reside at a single physical location, comprising one or more types of data storage, or be distributed across a plurality of physical systems in various forms. CPU 16 may likewise comprise a single processing unit, or be distributed across one or more processing units in one or more locations, e.g., on a client and server.

I/O interfaces 20 may comprise any system for exchanging information to/from an external source. External devices 22 may comprise any known type of external device, including speakers, a CRT, LED screen, hand-held device, keyboard, mouse, voice recognition system, speech output system, printer, monitor, facsimile, pager, etc. Bus 18 provides a communication link between each of the components in the server 12 and likewise may comprise any known type of transmission link, including electrical, optical, wireless, etc. Although not shown, additional components, such as cache memory, communication systems, system software, etc., may be incorporated into server 12.

Database 24 may provide storage for information necessary to carry out the present invention such as collected state information, etc. As such, database 24 may include one or more storage devices, such as a magnetic disk drive or an optical disk drive. In another embodiment, database 24 includes data distributed across, for example, a local area network (LAN), wide area network (WAN) or a storage area network (SAN) (not shown). Database 24 may also be configured in such a way that one of ordinary skill in the art may interpret it to include one or more storage devices.

It should be understood that although not shown in FIG. 1, remote systems 11 and 26, and workstations 30 and 32 typically include computer components (e.g., CPU, memory, etc.) similar to server 12. Such components have not been shown for brevity purposes.

Stored in memory 14 (as a program product) is collection system 38, which utilizes utilities 35 of platform 37 to locate and/or collect general and state information from server 12. As depicted, collection system 38 includes platform system 40, general information system 42, state system 44, security system 46, and output system 48. In general, collection system 38 will identify the type of platform 37 that is operating on server 12. Once identified, utilities 35 will be used to locate and/or collect desired state information. Once collected, the state information can be stored in database 24 and/or outputted to investigator 34. Specifically, when network 10 is intruded, collection system 38 can be executed. Upon execution, platform system 40 will first identify the type of platform 37 operating thereon. As indicated above, state information may be stored differently depending on the type or version of platform 37 operating on server 12. Accordingly, platform system 40 will identify the precise platform 37 (e.g., UNIX version "A," Windows XP, etc.) that is operating. Once identified, all information can be located and collected using utilities 35. Specifically, collection system 38 (or the sub-systems thereof) is programmed to know which utilities to use to locate each piece of desired information for each different type of platform. That is, collection system 38 is programmed to know where to look for each piece of information, or where to find out how to locate a piece of information. Thus, whether the platform on server 12 is Windows XP or UNIX, the same information will be collected.

Once the type of platform 37 has been identified, security system 36 will secure the information collection process. This can be accomplished, for example, by implementing a race condition in the creation of a temporary file to protect the information as it is being collected. Such protection will guard against, among other things, simlink attacks against the temporary files created during information collection.

Once the collection process has been secured, general information system 42 will automatically collect general (header) information from server 12. Such information typically includes, among other things, the name of server 12, the type of server 12, the date as kept by server 12, etc.

Figure 2:
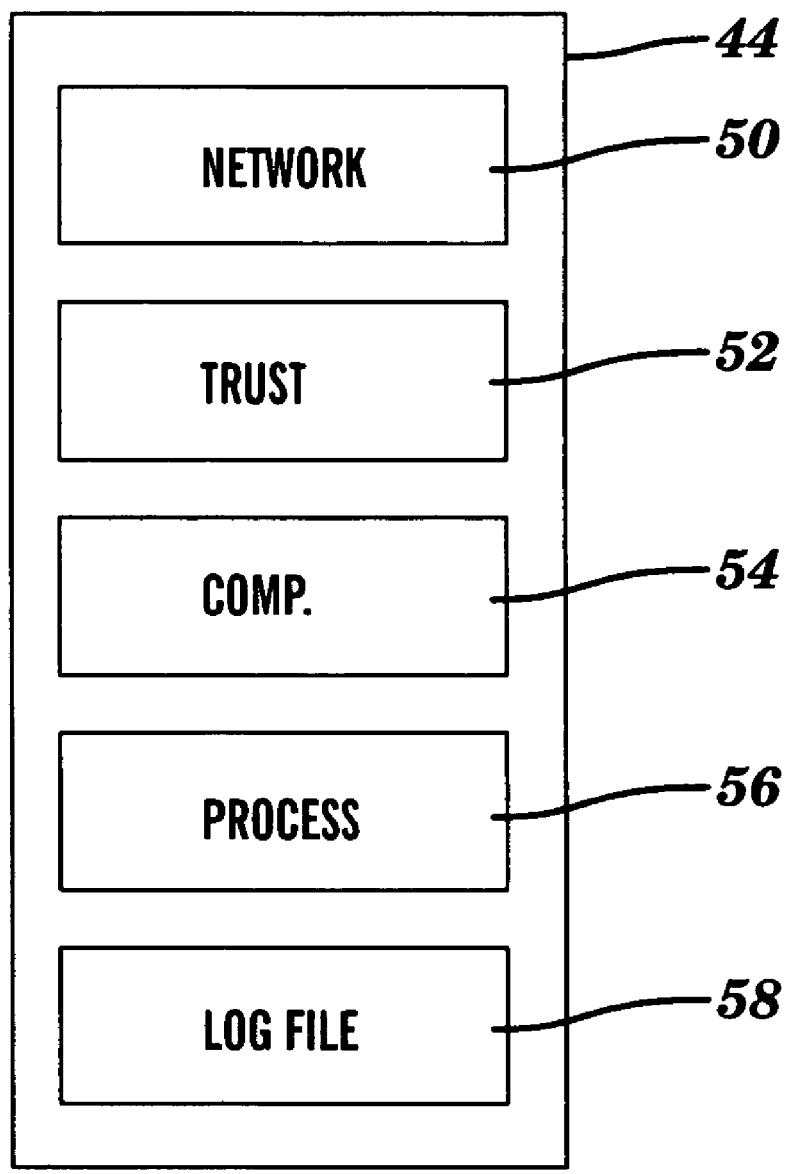
FIG. 2 depicts the state system of FIG. 1 in greater detail.

Once general information has been collected, state system 44 will automatically collect the state information. In general, state information collected under the present invention includes network information, trust information, computer (server 12) information, process information and log file information. Referring now to FIG. 2, state system 44 is shown in greater detail. Network system 50 will automatically collect information pertaining to network 10 in which server 12 is operating. Network information typically includes information pertaining to, among other things, network interface configurations, network routing information, open network ports, available services, processes bound to the services, etc. The collected network information may identify a point of intrusion as well as any changes made to the network resulting from the intrusion.

Once network information has been collected, trust system 52 will automatically collect information pertaining to any trusts extended by server 12 over network 10. Specifically, when a trust is established with server 12, a connection is created through which communication can easily pass. Such trusts can be an easy point of intrusion for hacker 28.

After the trust information has been collected, computer information system 54 will automatically collect computer information pertaining to server 12 itself. Computer information generally includes information pertaining to, among other things, common intrusion indicators (e.g., .. (dot-dot) directories), set user identification (UID) and set group identification (GID) files (e.g., to identify processes running with high privileges than other processes), I-node values (e.g., to identify files that were recently changed), configured file systems (e.g., to identify what file systems are configured and open), users currently logged on, loaded kernel modules (e.g., to determine if a kernel module is loaded that should not be loaded), how many reboots have occurred, and password files (e.g., to identify any passwords that have been recently used).

After computer information has been collected, process system 56 will automatically collect process information. In general, process information includes information pertaining to, among other things, scheduled current jobs, process lists, environment variables, and open files and the process using them. Collecting process information can give investigator 34 a good idea of how the network and/or server 12 were affected by the intrusion. Finally, once process information has been collected, log file system 58 will automatically collect log file information from the hard drive of server 12. Such information should pertain to, among other things, active log files, and parsed log files.

As indicated above, all information location and/or collection under the present invention (header and state) are done so based on the platform type operating on server 12 (e.g., via utilities 35). Thus, either the individual subsystems will be informed where to obtain the information, or they will be informed how to find out where to obtain the information. It should be appreciated that separate subsystems have been shown in FIGS. 1 and 2 for illustrative purposes only and other variations could be implemented.

For example, state system 44 could be comprised of a single sub-system that collects all state information.

Referring back to FIG. 1, once all information has been collected it can be secured for output to investigator 34. In general, security is provided by security system 46 in the form of cryptography. For example, the outputted information can be hashed and cryptographically summed. However, it should be understood that security of the output can be provided in any known manner.

Figure 3:
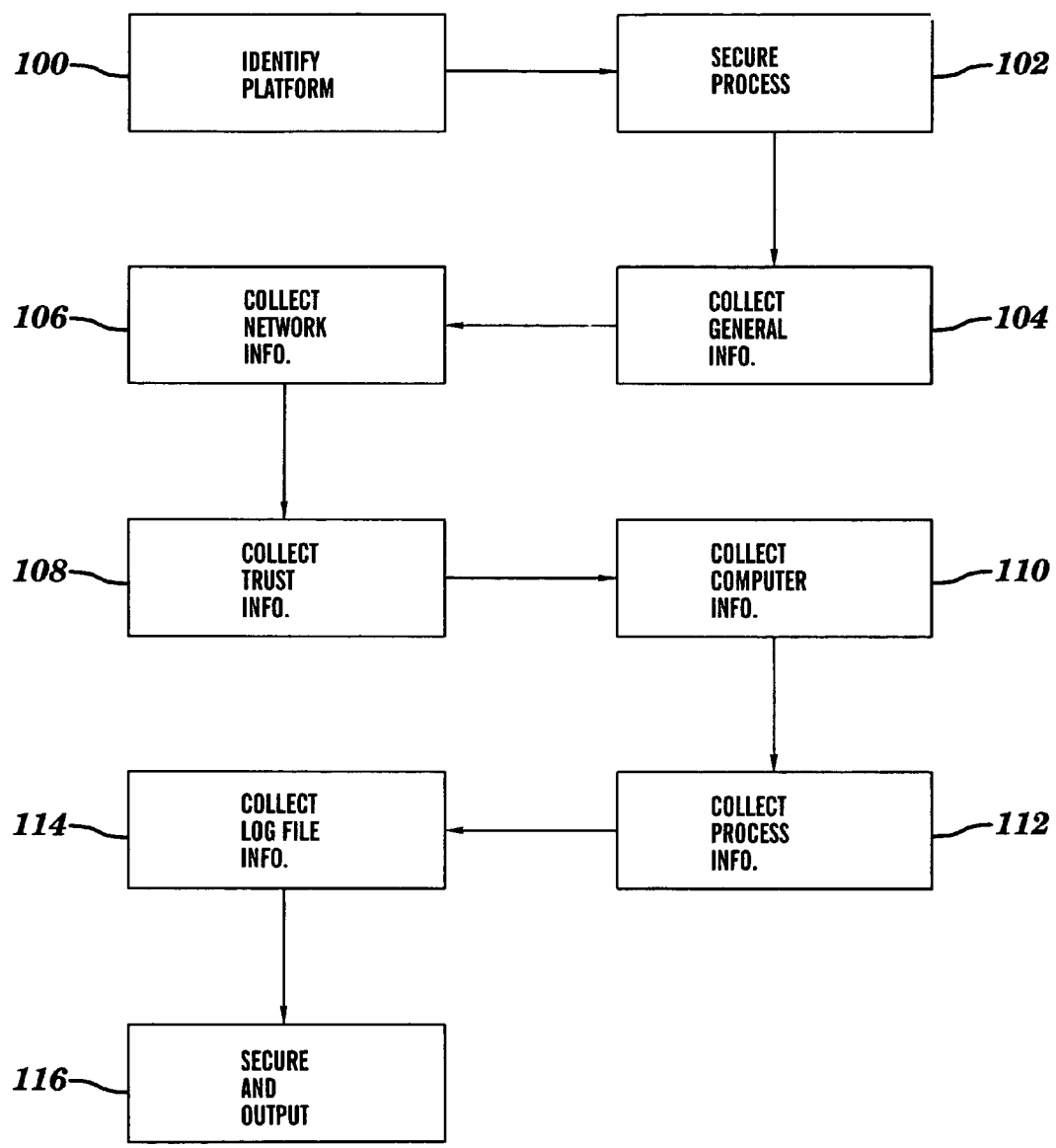
FIG. 3 depicts a process flow diagram according to the present invention.

Referring now to FIG. 3 a process flow chart according to the present invention is shown in detail. As depicted, upon execution, a platform will be identified 100. Once identified, security system 46 will secure the collection process 102. As indicated above, this can be accomplished through a race condition in the creation of a temporary file. Once protection of the information during collection is provided, general (header) information will be automatically collected 104 followed by network information 106. After network information has been collected, trust information will be collected 108 so that any trusts extended by server 12 over network 10 can be evaluated. Then, computer information will be collected 110 pertaining to server 12 itself. Once collected, process information will be collected 112 and all log file information will be gathered 114. Then, all collected information will be cryptographically secured and outputted to investigator 116.

It should be understood that a particular order for collecting information has been set forth herein for illustrative purposes only and other variations could be implemented. For example, computer system information could be collected prior to network information, etc.

It is understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls server 12 such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

EXAMPLE

Shown below is exemplary code for the present invention:

```
umask 077
PATH=/bin:/sbin:/usr/bin:/usr/sbin
export PATH
system=`uname`
```

-continued

```
exec > forensics.txt 2>/dev/null
num=$$
prog='basename $0'
if [ -z "$TMPDIR" ]
then
     TMPDIR=/tmp/$prog
else
     TMPDR=$TMPDIR/$prog
fi
export TMPDIR
if[ !-w "'dirname $TMPDIR'" ]
then
     echo "$prog: could not write to directory\"'dirname $TMPDIR'\"" >&2
     exit 1
fi
while:
do
     if mkdir -m 0700 $TMPDIR.$num 2>/dev/null
     then
          break
     fi
     num='expr' $num + 1'
done
TMPDIR=$TMPDIR.$num
cleanup() {
     cd /
     /bin/rm -rf $TMPDIR 2>/dev/null
}
trap 'rc=$?; trap "" 0; cleanup; exit $rc'1 2 3 15
trap 'cleanup; exit' 0
filelist=$TMPDIR/filelist.tmp
1slist=$TMPDIR/1slist.tmp
wtmpfile=$TMPDIR/wtmpfile
echo "" >/dev/tty
echo "IBM Global Services, Managed Security Services Delivery" >/dev/tty
echo "For questions contact: ccalvert@us.ibm.com">/dev/tty
echo "" >/dev/tty
echo
"*************************************************"
>/dev/tty
echo "* This script captures a forensic snapshot of a potentially *" >/dev/tty
echo "* compromised UNIX system. This script outputs a fils name *" >/dev/tty
echo "* forensics.tar.Z into the directory from which it was run. *" >/dev/tty
echo "* This script must be run as root.           *" >/dev/tty
echo
"*************************************************"
>/dev/tty
echo "" >/dev/tty
echo "." >/dev/tty
echo "Gathering general information." >/dev/tty
echo -n "." >/dev/tty
cat <<eof
System Name: 'hostname'
Date: 'date'
System Type: 'uname -a'
Uptime: 'uptime'
eof
echo "." >/dev/tty
echo "Gathering network information." >/dev/tty
echo ""
echo "################################################"
echo "#          Network Information          #"
echo "################################################"
echo ""
echo ""
echo -n "." >/dev/tty
echo "The network configuration for each interface is."
echo
*****************************************************************
*******"
echo ""
ifconfig -a
echo ""
echo -n "." >/dev/tty
echo "This is the network routing information:"
echo
*****************************************************************
*******"
echo ""
```

-continued

```
netstat -rn
echo ""
echo ""
echo -n "." >/dev/tty
echo "This is a netstat listing of open network connections:"
echo
"************************************************************
*******"
echo ""
netstat -tul
echo ""
echo ""
echo -n "." >/dev/tty
echo "This is the 1sof list of open network connections:"
echo
"************************************************************
*******"
echo ""
if [ -x /usr/sbin/1sof] ; then
    1sof -1i
    echo ""
    echo ""
else
    echo "1sof is not installed on this system."
    echo ""
    echo ""
fi
echo ""
echo ""
echo -n "." >/dev/tty
echo "This captures any .rhosts files and the hosts.equiv: "
echo
"************************************************************
*******"
echo ""
1s -1/etc/hosts.equiv
cat/etc/hosts.equiv
echo ""
echo ""
echo -n "." >/dev/tty
for i in 'cut -f 6 -d ":" /etc/passwd|sort -u'
do
    1s -1 $i/.rhosts
    cat $i/.rhosts
done
echo ""
echo ""
echo "." >/dev/tty
echo "Gathering system information." >/dev/tty
echo""
echo "################################################"
echo "#        System Information         #"
echo "################################################"
echo ""
echo ""
echo "." >/dev/tty
# To Do: Parse mount for local file systems and then use the xdev option to stay
on the system
#This creates temp files with all the stuff we need to find.
echo "Creating file list for searching." >/dev/tty
find /\( -name "..*" -o -perm -4000 -o -perm -2000 -o -mtime -5 \) > $filelist
xargs 1s -dal < $filelist > $1slist
echo -n "." >/dev/tty
echo "Find all suspicious hidden directories and files on the system:"
echo
"************************************************************
*******"
echo ""
fgrep '..' $1slist
echo ""
echo ""
echo -n ".">/dev/tty
echo "Find all the suid and sgid files on the system:"
echo
"************************************************************
*******"
echo ""
grep [r-][w-]s $1slist
echo ""
```

-continued

```
echo ""
echo -n "." >/dev/tty
echo "Find all files with modify times in the last 5 days:"
echo
"*******************************************************************
*******"
echo ""
while read i; do
    find $i -mtime -5 -ls
    done < $filelist|grep -v /proc/\*
echo ""
echo ""
echo -n "." >/dev/tty
echo "All local filesystems are listed below:"
echo
"*******************************************************************
*******"
echo ""
case "$system" in
    Linux)      df -al ;;
    SunOS)      df -al ;;
    OpenBSD) df -hl ;;
    AIX) df ;;
esac
echo ""
echo ""
echo -n "." >/dev/tty
echo "The following people are currently logged in:"
echo
"*******************************************************************
*******"
echo ""
who
echo ""
echo -n "." >/dev/tty
echo ""
w
echo ""
echo ""
echo -n "." >/dev/tty
echo "This lists the loaded kernel modules."
echo
"*******************************************************************
*******"
echo ""
case "$system" in
    Linux) lsmod ;;
    SunOS) echo "LKM command unknown" ;;
    OpenBSD) modstat ;;
    AIX) scls ;;
esac
echo ""
echo ""
echo -n "." >/devltty
echo "This is a record of logins, reboots and runlevel changes:"
echo
"*******************************************************************
*******"
echo ""
last
echo ""
echo ""
echo -n "." >/dev/tty
echo "This is the /etc/passwd file:"
echo
"*******************************************************************
*******"
echo ""
cat /etc/passwd
echo ""
echo ""
echo -n "." >/dev/tty
echo "This is the record of old wtmp files:"
echo
"*******************************************************************
*******"
echo ""
case "$system" in
    Linux) for a in /var/log/wtmp*.gz
```

```
                    do
                            gunzip -c $a > $wtmpfile
                            last -f$wtmpfile
                    done ;;
        OpenBSD) for a in /var/log/wtmp.*.gz
                    do
                            gunzip -c $a > $wtmpfile
                            last -f$wtmpflle
                    done ;;
        SunOS) for a in /var/admlwtmp*.gz
                    do
                            gunzip -c $a > $wtmpfile
                            last -f$wtmpfile
                    done ;;
        AIX) for a in /var/adm/wtmp*.gz
        # does AIX zip its old files
                    do
                            gunzip -c $a > $wtmpfile
                            last -f$wtmp file
                    done ;;
esac
echo ""
echo ""
echo "." >/dev/tty
echo "Gathering process information." >/dev/tty
echo ""
echo "###############################################"
echo "#         Process Information          #"
echo "###############################################"
echo ""
echo ""
echo -n "." >/dev/tty
echo "This shows the cron jobs:"
echo
"*********************************************************
*******"
echo ""
case "$system" in
        Linux)      for FILE in /var/spool/cron/*
                        do ls -1 $FILE
                            cat $FILE
                            echo ""
                            ls -1/etc/cron*
                        done ;;
        SunOS) for FILE in /var/spool/cron/crontabs/*
                        do ls -1 $FILE
                            cat $FILE
                        done ;;
        OpenBSD) for FILE in /var/cron/tabs/*
                        do ls -1 $FILE
                            cat $FILE
                        done ;;
        AIX) for FILE in /var/spool/cron/crontabs/*
                        do ls -1 $FILE
                            cat $FILE
                        done ;;
esac
echo ""
echo ""
echo -n "." >/dev/tty
echo "This is a list of running processes:"
echo
"*********************************************************
*******"
echo ""
case "$system" in
    Linux) ps -ef ;;
    SunOS) ps -ef ;;
    OpenBSD) ps auxw ;;
    AIX) ps -ef ;;
esac
echo ""
echo ""
echo -n "." >/dev/tty
echo "This dumps the current environment:"
echo
"*********************************************************
*******"
echo ""
```

-continued

```
case "$system" in
    Linux) ps gxeww ;;
    SunOS) env ;;
    OpenBSD) ps gxeww ;;
    AIX) ps gxeww ;;
esac
echo ""
echo ""
echo -n "." >/dev/tty
echo "This is the list of open files:"
echo
"*************************************************
*******"
echo ""
if [ -x /usr/sbin/lsof ] ; then
    lsof
    echo ""
    echo ""
else
    echo "lsof is not installed on this system."
    echo ""
    echo ""
fi
echo ""
echo ""
echo "." >/dev/tty
echo "Gathering log file information." >/dev/tty
echo ""
echo "###############################################"
echo "#        Log Files                    #"
echo "###############################################"
echo ""
echo ""
echo -n ".">/dev/tty
echo "This is the conglomeration of all history files on the system:"
echo
"*************************************************
*******"
echo ""
for i in `cut -f 6 -d ":" /etc/passwd|sort -u`
do
    echo $i
    ls -1 "$i"/.*history
    echo
"*************************************************
*******"
    cat "$i"/*history
    echo ""
    echo ""
done
echo -n"." >/dev/tty
echo "This is all the log files parsed from the syslog.conf:"
echo
"*************************************************
*******"
echo ""
awk '/^#/||/^$/||$2~/\*/ {next} {print $2}' /etc/syslog.conf|sort -u|while read i
do
    echo ""
    ls -1 $i
    echo
"*************************************************
*******"
    cat $i
    echo ""
    echo ""
done
echo -n "." >/dev/tty
echo ""
echo "###############################################"
echo "#        Old Log Files                #"
echo "###############################################"
echo ""
echo ""
echo -n "." >/dev/tty
echo "These are old log files:"
echo
"*************************************************
*******"
```

-continued

```
echo ""
for i in `cat/etc/syslog.conf|grep -v "^#"|awk '{print $2}'|sort -u|grep var`
do
    for j in "$i"*.gz
    do
        echo ""
        ls -1 $j
        echo
"*********************************************************************
*******"
        gunzip -c "$j"
        echo ""
        echo ""
    done
    for j in "$i".Z
    do
        echo ""
        ls -1 $j
        echo
"*********************************************************************
*******"
        zcat "$j"
        echo ""
        echo ""
    done
done
echo "." >/dev/tty
echo "The script has completed; the output is named forensics.tar.Z" >/dev/tty
if [ -x /usr/bin/md5sum ] ; then
    /usr/bin/md5sum -b forensics.txt > forensics.md5
fi
```

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A system for automatically collecting state information for computer system intrusion analysis, comprising:
   a platform identification system for automatically identifying a type of a platform loaded on a computer system; and
   a state system for automatically collecting state information pertaining to a state of the computer system, wherein the state information is located with utilities of the identified platform, and wherein the state system comprises a network system for automatically collecting network information pertaining to a network in which the computer system is operating.

2. The system of claim 1, wherein the computer system is a server.

3. The system of claim 1, wherein the state system further comprises:
   a log file system for automatically collecting configured log files from the computer system;
   a process system for automatically collecting process information pertaining to processes running on the computer system;
   a computer information system for automatically collecting computer information; and
   a trust system for automatically collecting trust information pertaining to trusts extended by the computer system over the network.

4. The system of claim 3, wherein the collected computer information pertains to: intrusion indicators, set UID files, set GID files, I-node values, configured file systems, users currently logged on the computer system, loaded kernel modules, user reboots, and password files.

5. The system of claim 3, wherein the collected network information pertains to network interface configurations, network routing information, open network ports, and current services.

6. The system of claim 3, wherein the collected process information pertains to scheduled current jobs, process lists, environment variables and open files.

7. The system of claim 3, further comprising:
   a general information system for automatically collecting general information from the computer system; and
   an output system for outputting the general information, computer state information, network state information, process information, trust information and log files.

8. The system of claim 7, further comprising:
   a security system for securing cryptographically securing the outputted general information, computer state information, network state information, process information, trust information and log files.

9. A method for automatically collecting stale information for computer system intrusion analysis, comprising the steps of:
   identifying a type of a platform loaded on a computer system;
   locating state information pertaining to a state of the computer system using utilities of the identified platform; and
   automatically collecting the located state information from the computer system.

10. The method of claim 9, further comprising:
    automatically collecting configured log files from the computer system;

automatically collecting process information pertaining to processes running on the computer system;

automatically collecting computer information pertaining to the computer system;

automatically collecting network information pertaining to a network in which the computer system is operating;

automatically collecting trust information pertaining to trusts extended by the computer system over the network; and outputting the collected system state information, the network state information, the log files and the process information.

11. The method of claim 10, wherein the collected computer information pertains to: intrusion indicators, set UID files, set GID files, I-node values, configured file systems, users currently logged on the computer system, loaded kernel modules, user reboots, and password files.

12. The method of claim 10, wherein the collected network information pertains to network interface configurations, network routing information, open network ports, and current services.

13. The method of claim 10, wherein the collected process information pertains to scheduled current jobs, process lists, environment variables and open files.

14. The method of claim 10, further comprising the step of securing the outputted computer state information, network state information, process information, trust information and log files.

15. The method of claim 14, wherein the securing step comprises the step of cryptographically securing the outputted computer state information, network state information, process information, trust information and Jog files.

16. A program product stored on a recordable medium for automatically collecting state information for computer system intrusion analysis, which when executed comprises:

program code for automatically identifying a type of a platform loaded on a computer system;

program code for automatically collecting state information pertaining to a state of the computer system, wherein the state information is located with utilities of the identified platform; and program code fix automatically collecting network information pertaining to a state of a network in which the computer system is operating.

17. The program product of claim 16, wherein the computer system is a server.

18. The program product of claim 16, further comprising:

program code for automatically collecting configured log files from the computer system;

program code for automatically collecting process information pertaining to processes running on the computer system;

program code for automatically collecting computer information pertaining to the computer system;

program code for automatically collecting trust information pertaining to trusts extended by the computer system over the network.

19. The program product of claim 18, wherein the collected computer information pertains to: intrusion indicators, set UID files, set GID files, I-node values, configured file systems, users currently logged on the computer system, loaded kernel modules, user reboots, and password files.

20. The program product of claim 18, wherein the collected network information pertains to network interface configurations, network routing information, open network ports, and current services.

21. The program product of claim 18, wherein the collected process information pertains to scheduled current jobs, process lists, environment variables and open files.

22. The program product of claim 18, further comprising:

program code for automatically collecting general information from the computer system; and program code for outputting the collected general information, system state information, the network state information, the log files and the process information.

23. The program product of claim 22, further comprising program code for cryptographically securing the outputted general information, computer state information, network state information, process information, trust information and log files.

* * * * *

UNITED STATES PATENT AND TRADEMARK OFFICE
CERTIFICATE OF CORRECTION

PATENT NO. : 7,080,250 B2  Page 1 of 1
APPLICATION NO. : 10/112829
DATED : July 18, 2006
INVENTOR(S) : Christopher L. Calvert It is certified that error appears in the above-identified patent and that said Letters Patent is hereby corrected as shown below:

Claim 9, column 18, line 55, please delete "stale" and insert --state--.

Claim 15, column 19, line 33, please delete "Jog" and insert --log--.

Claim 16, column 20, line 1, please delete "fix" and insert --for--.

Signed and Sealed this

Fourteenth Day of November, 2006

JON W. DUDAS
*Director of the United States Patent and Trademark Office*